United States Patent [19]

Chang

[11] Patent Number: 5,068,037

[45] Date of Patent: Nov. 26, 1991

[54] REMOVAL OF FE$^{(II)}$ FROM HYDROXYLAMINE SULFATE SOLUTION

[75] Inventor: Chin-Hsiung Chang, Palatine, Ill.

[73] Assignee: Allied-Signal Inc., Morris Township, Morris County, N.J.

[21] Appl. No.: 619,854

[22] Filed: Nov. 29, 1990

[51] Int. Cl.$^5$ .................... B01D 11/04; B01D 15/04; C02F 1/64
[52] U.S. Cl. .................................... 210/638; 210/681
[58] Field of Search ............... 210/634, 638, 639, 660, 210/681, 683–685, 688–692; 423/632–634

[56] References Cited

FOREIGN PATENT DOCUMENTS 63-166436 7/1988 Japan .
1323550 7/1987 U.S.S.R. .

OTHER PUBLICATIONS

Umetani et al., "The Solvent Extraction of Divalent Metals with 1-Phenyl-3-Methyl-4-Trifluoroacetyl-pyrazol-5-one and TOPO as the Group Separation and Concentration Methods of Trace Metals", Bull Inst. Chem Res., Kyoto Univ., vol. 60, No. 3–4, 1982.

*Primary Examiner*—Frank Sever
*Attorney, Agent, or Firm*—Harold N. Wells; Jay P. Friedenson; Gerard P. Rooney

[57] ABSTRACT

Purification of a concentrated aqueous solution of hydroxylamine sulfate (HAS) is carried out by contacting with an organic solution of 1-phenyl-3-methyl-4-trifluoroacetylpyrazol-5-one (HPMTFP) and trioctylphosphine oxide (TOPO). Divalent iron (Fe$^{II}$) is removed to below about 3 wt. ppm making it possible to use the purified solution directly in the production of oxime compounds without further purification heretofore required.

9 Claims, No Drawings

REMOVAL OF FE(II) FROM HYDROXYLAMINE SULFATE SOLUTION

The invention relates generally to the process for producing oxime compounds and more particularly to purification of hydroxylamine sulfate (HAS) which is used as a reagent in producing such oximes.

When hydroxylamine sulfate is reacted with an aldehyde or a ketone, an oxime compound is formed. Since the hydroxylamine sulfate is prepared by the reaction of sulfuric acid with methyl ethyl ketoxime (MEKO) any impurities found in the sulfuric acid are carried over into the hydroxylamine sulfate (hereinafter also "HAS"). Of particular concern is the iron content, which is considered a source of color in the oxime products and therefore must be removed. This may be done by crystallizing the HAS which effectively removes the iron to very low levels. However, this leaves the iron and other impurities in more concentrated form in the residual solution and ultimately produces a loss of HAS and a disposal problem. Alternatively, pure HAS may be made by using ultra-pure sulfuric acid. If the iron could be selectively removed without the use of crystallization the HAS recovery would be improved and there would be no need to redissolve the crystals before using the HAS as a reagent in the production of oximes. The present inventor has discovered an effective process for the selective removal of the small amount of iron in HAS, as will be disclosed in the description below.

Hydroxylamine sulfate has been used along with a mineral acid as a treatment for removing iron, from aluminosilicate materials in SU1323550. It also has been suggested as a component of a mixture with an acrylonitrile resin, diethylenetriamine, and ethanol used to scavenge heavy metals such as Ga, In, Co, and Ni from a sodium aluminate solution in JP63166436. Thus, it might be expected that removal of minor amounts of iron below any 20 wt. ppm from hydroxylamine sulfate could be difficult.

In Bull. Inst. Chem., Kyoto Univ., Vol. 60, No. 3–4, 1982, Umetani et al. report that a two-part mixture of 1-phenyl-3-methyl-4-trifluoroacetylpyrazol-5-one (HPMTFP) and TOPO (trioctylphosphine oxide) may be used to remove traces of divalent metals from ground waters. Iron is one such divalent metal. The water was buffered with acetic acid-sodium acetate and sodium perchlorate and then extracted with a cyclohexane solution containing 0.02 or 0.05M HPMTFP and 0.01M TOPO. It was reported by Umetani et al. that about 100% of the iron was removed at a pH above about 2.4 but the extraction was less effective at lower pH values and was essentially ineffective below a pH of about 1. They noted that in order to assure the iron was divalent that hydroxylammonium chloride was added to the water being treated. The amount used was not reported but since the amount of iron present was probably quite low, the amount of the hydroxylammonium chloride is believed to have been quite small. Consequently, whether such an extractant would be successful when applied to a concentrated solution of HAS cannot be predicted, especially where the iron is in small amounts and where it may be chemically bound to the HAS or to other components of the HAS solution. In fact, as will be seen, other potentially useful extractants were tested and found of little value in extraction of iron from HAS solutions.

SUMMARY OF THE INVENTION

Aqueous solutions of HAS may be purified by contacting with an organic solution of a non-polar solvent, preferably cyclohexane, hexane, methyl ethyl ketoxime, toluene, pentane, and heptane which contains about 0.005 to 0.05 mol of HPMTFP and about 0.0025 to 0.025 mol of TOPO for each liter of solution (hereinafter "M") at a pH above about 2 to 3 or more, preferably above 2.5. The iron content of such HAS solutions may be from about 5 to 100 wt. ppm and typically will be about 10 to 20 wt. ppm. The Fe(II) content of the HAS solution can be reduced by 90% or more. When the iron content is no more than about 3 wt. ppm, it is unnecessary to purify the HAS by crystallization before using it to prepare oxime compounds.

DETAILED DESCRIPTION OF THE INVENTION

Hydroxylamine sulfate (HAS) is produced by the reaction of sulfuric acid on methyl ethyl ketoxime (MEKO). Since the acid contains about 1 to 10 wt. ppm Fe resulting from the manufacturing process the crude HAS solution, typically containing about 20 to 40 weight percent HAS includes about 10 to 50 wt. ppm iron, substantially as Fe(II). When the hydroxylamine sulfate is to be used for preparing oxime compounds by its reaction with an aldehyde or ketone, the iron has been found to create an objectionable color in the product oxime. Consequently, the iron is removed to below about 3 wt. ppm. An effective method of removing such iron is to crystallize the HAS out of solution, leaving behind the iron in a concentrated HAS solution. The HAS crystals are recovered and redissolved for use in preparing oxime compounds.

According to the present invention, the iron can be selectively removed from the original HAS solution, making it directly useful in making oximes and avoiding the expensive and cumbersome crystallization and redissolution previously employed. It has been found that a synergistic combination of reagents is very effective in removing iron from crude HAS solutions, down to at or below 3 wt. ppm.

Reagents

HPMTFP (1-phenyl-3-methyl-4-trifluoro-acetyl-pyrazol-5one) is somewhat effective alone in removing iron from HAS solutions, as will be seen in Table B below. This compound may be prepared from 1-phenyl-3-methylpyrazol-5-one by contacting it with trifluoroacetic anhydride, according to the method of Jenson, Acta Chem. Scand., 13, 1668 (1959).

TOPO (trioctyl phosphine oxide) is not at all effective in removing iron from HAS solutions as will be seen in Table B below. However, when TOPO is combined with HPMTFP the extraction of Fe(II) is markedly improved and can approach 100% when the pH is above about 3.0.

The two synergistic compounds are dissolved in a nonpolar organic solvent. Such solvents should not be soluble to any significant extent in the aqueous phase and should be capable of dissolving the reagents in the needed concentrations. Typical and useful compounds include cyclohexane, hexane, methyl ethyl ketoxime, toluene, pentane, and heptane. Cyclohexane is particularly useful, as will be seen in the examples below.

Process

The two reagents are dissolved in the selected solvent(s) in concentrations of about 0.005 to 0.05M for HPMTFP, preferably about 0.01 to 0.02M, and about 0.0025 to 0.025M for TOPO, preferably about 0.005 to 0.01M. These concentrations will be adjusted as required to provide the optimum removal of Fe(II) depending upon the concentration of Fe(II) present and the composition and pH of the HAS solution.

The reagent solution will be contacted with the HAS solution in any convenient manner, which could be batch or continuous. The volume ratio of the reagent solution to the HAS solution should be between about 1:1 and 50:1. A ratio of about 1:1 to 5:1 is preferred. Good contacting of the two immiscible solutions is highly desirable to provide the most effective removal of Fe(II). Accordingly, vigorous stirring will typically be employed or contacting devices familiar to those skilled in the art may be used.

The reaction may be carried out at temperature from about 10° to 50° C. Ambient temperatures have been found to be satisfactory to provide essentially complete removal of Fe(II) from HAS solutions.

The contacting may require up to about 1 to 1.5 hours to provide the best results, but as will be understood by those skilled in the art, the required contacting time will depend upon a number of factors, such as the temperature, the solvent(s), the concentration(s) of the reagents(s), and the pH of the HAS solution.

After sufficient contacting, the immiscible solutions may be readily separated by settling and decantation. Then the purified HAS solution may be recovered, after which it is ready for use in preparing oxime compounds or for other purposes.

EXAMPLE I
(Comparative)

A sample of hydroxylamine sulfate solution[1] was tested with various potential chelating agents. As will be seen in the table below little or no removal of Fe was observed and, in fact, some of the reagents appeared to have contributed to the iron content of the solution.

TABLE A

| Reagent | Amount | Fe (wt. ppm) |
| --- | --- | --- |
| None | — | 33.3 |
| EDTA on carbon[2] | 20 mL HAS/10 mL absorbent | 77.8 |
| EDTA on resin[3] | 20 mL HAS/10 mL absorbent | 31.8 |
| 8-Hydroxyquinoline on carbon | 20 mL HAS/10 mL absorbent | 201. |
| 8-Hydroxyquinoline on resin[4] | 20 mL HAS/10 mL absorbent | 30.5 |

[1]HAS - 38.3% wt. %
Methyl ethyl ketoxime - 5.5 wt. %
Fe(II) - 32 wt. ppm
Dimethylglyoxime - 135 wt. ppm
pH - 2
[2]ethylene diaminetetraacetic acid on OL activated carbon (Calgon)
[3]ethylene diaminetetraacetic acid on XAD-4 resin absorbent (Rohm & Haas)
[4]resin support XAD-4 (Rohm & Haas)

Example II

A 30 mL sample of the hydroxylamine sulfate solution used in Example I was contacted with 30 mL of cyclohexane solutions containing HPMTFP, TOPO, or both. The pH was adjusted by adding 8 N sodium hydroxide solution. The results indicate the synergistic effect of the combination of the two reagents.

TABLE B

| pH After Extraction (60 min) | Concentration (M) HPMTFP | TOPO | % Fe(II) Extraction |
| --- | --- | --- | --- |
| 2.3 | 0 | 0.01 | 0 |
| 2.2 | 0.02 | 0 | 23 |
| 2.2 | 0.02 | 0.01 | 80 |
| 3.0 | 0.02 | 0.007 | 100 |
| 3.0 | 0.02 | 0.004 | 99 |
| 3.0 | 0.01 | 0.01 | 99 |
| 3.0 | 0.01 | 0.005 | 97 |

Example III

Samples (30 mL) of the hydroxylamine sulfate solution of Example I were contacted with 30 mL portions of hexane solutions containing 0.02M HPMTFP and 0.01M TOPO. The pH was adjusted by adding 8N NaOH solution. After 1-1.5 hours contacting the organic and aqueous phases were separated and the Fe(II) content of the aqueous phase (HAS) was analyzed by atomic absorption. The results are shown in the table below.

TABLE C

| pH after extraction | Initial ppm Fe(II) | Final ppm Fe(II) | Percent extraction |
| --- | --- | --- | --- |
| 0.8 | 30.0 | 25.0 | 17 |
| 1.6 | 30.0 | 24.0 | 20 |
| 1.8 | 30.0 | 19.6 | 35 |
| 2.0 | 30.0 | 15.4 | 35 |
| 2.2 | 30.0 | 9.2 | 69 |
| 2.5 | 30.0 | 1.8 | 94 |
| 2.8 | 31.3 | 1.0 | 97 |
| 3.1 | 36.0 | 0.8 | 98 |
| 4.0 | 31.3 | 0.7 | 98 |

It will be seen that while some Fe(II) was extracted even below pH of 0.8 the most effective extraction was obtained at a pH above about 2.2, particularly above 2.5.

Example IV

In a series of tests following the procedure of Example III, three organic solvents were compared for their effectiveness in Fe(II) removal from HAS solutions. The results of these tests are shown in the following table.

TABLE D

| pH after Extraction | % Extraction Hexane | Cyclohexane | MEKO |
| --- | --- | --- | --- |
| 2.2 | 69 | 80 | 30 |
| 3.1 | 98 | 100 | — |

Of the solvents tested, cyclohexane appeared to provide the most effective removal of Fe(II) from the HAS solution.

Example V

A series of experiments were carried out to determine the ability of HPMTFP and TOPO in mixtures of methyl ethyl ketoxime (MEKO) and hexane to extract Fe(II) from the hydroxylamine sulfate solution of Example I and following the procedure of Example III. The results are given in the following table.

TABLE E

| Vol. % MEKO[1] | Final pH | Final[2] Fe (ppm) | % Extraction |
|---|---|---|---|
| 100 | 2.83 | 4.9 | 82.5 |
| 80 | 2.85 | 3.1 | 88.9 |
| 60 | 2.84 | 1.7 | 93.9 |
| 40 | 2.86 | 0.8 | 97.1 |

[1] included 0.02M of HPMTFP and 0.01M TOPO
[2] initial Fe = 28 wt. ppm

It can be seen that addition of hexane to MEKO substantially improved the effectiveness of extraction of Fe(II).

Example VI

The used extraction solutions from Example V were regenerated by contacting with equal amounts of 2M $H_2SO_4$ to the organic solution containing the chelating agents. The $H_2SO_4$ phase was separated and the Fe content measured by atomic absorption to determine the capacity of the regenerated solution. Since the $H_2SO_4$ used contained 4.2 wt. ppm Fe the apparent regeneration at times exceeded 100%. The results are presented in the following table.

TABLE F

| Vol. % MEKO | Extractant Solution Fe (ppm) | Used (mL) | $H_2SO_4$ (mL) | % Regeneration |
|---|---|---|---|---|
| 100 | 22 | 30.8 | 43.6 | 125.3 |
| 80 | 23 | 29.3 | 38.8 | 112.4 |
| 60 | 24 | 28.4 | 37.3 | 110.6 |
| 40 | 22 | 28.3 | 36.0 | 94.9 |

I claim:

1. A process comprising purifying an aqueous solution of hydroxylamine sulfate containing about 5 to 100 wt. ppm (Fe(II)) to provide an iron concentration suitable for preparing oxime compounds by contacting said solution with an effective amount of a non-polar solvent containing about 0.005 to 0.005 M of HPMTFP and about 0.0025 to 0.025M of TOPO at a pH above about 2.0 for a period of time sufficient to remove said Fe(II) to below 3 wt. ppm and thereafter separating said non-polar solvent.

2. The process of claim 1 wherein said non-polar solvent at least one solvent selected from the group consisting of cyclohexane, hexane, methyl ethyl ketoxime, toluene, pentane, and heptane.

3. The process of claim 2 wherein said solvent is cyclohexane.

4. The process of claim 1 wherein said aqueous solution contains about 20 to 40 weight percent hydroxylamine sulfate.

5. The process of claim 1 wherein the pH is above about 2.5.

6. The process of claim 1 wherein said organic solution contains about 0.01 to 0.02M HPMTFP and about 0.005 to 0.01M TOPO.

7. The process of claim 1 wherein said contacting is carried out at a temperature of about 10° to 50° C.

8. The process of claim 1 wherein the volume ratio of said solvent containing HPMTFP and TOPO to said aqueous solution of hydroxylamine sulfate is between about 1:1 and 50:1.

9. The process of claim 8 wherein said volume ratio is between about 1:1 and 5:1.

* * * * *